(12) United States Patent
Chang

(10) Patent No.: US 8,193,716 B2
(45) Date of Patent: Jun. 5, 2012

(54) HIGH-POWER LED DRIVING CIRCUIT

(75) Inventor: Rong-Ming Chang, Taipei County (TW)

(73) Assignee: Chia-Cheng Chang, Linkou Township, Taipei County (TW)

( * ) Notice: Subject to any disclaimer, the term of this patent is extended or adjusted under 35 U.S.C. 154(b) by 441 days.

(21) Appl. No.: 12/566,932

(22) Filed: Sep. 25, 2009

(65) Prior Publication Data

US 2010/0079086 A1 Apr. 1, 2010

(30) Foreign Application Priority Data

Sep. 28, 2008 (CN) .................. 2008 2 0165158 U

(51) Int. Cl.
*H05B 37/00* (2006.01)
(52) U.S. Cl. .................. 315/209 R; 315/224; 315/225
(58) Field of Classification Search ............. 315/86–89, 315/93, 119, 121, 122, 123, 125, 127, 128, 315/193, 209 R, 210, 217, 224, 225, 226, 315/297, 306, 312, 313, 322, 320, 362
See application file for complete search history.

(56) References Cited

U.S. PATENT DOCUMENTS

| | | | |
|---|---|---|---|
| 7,317,287 B2 * | 1/2008 | Blumel | 315/291 |
| 2003/0116773 A1 * | 6/2003 | Kraus et al. | 257/88 |
| 2008/0297062 A1 * | 12/2008 | Otake et al. | 315/224 |
| 2010/0295460 A1 * | 11/2010 | Lin et al. | 315/193 |

* cited by examiner

*Primary Examiner* — Douglas W Owens
*Assistant Examiner* — Jianzi Chen
(74) *Attorney, Agent, or Firm* — Muncy, Geissler, Olds & Lowe, PLLC

(57) ABSTRACT

A high-power light-emitting diode (LED) driving circuit relates to a photoelectric technology field. An anode of D1 is connected to a constant current direct current (DC) power supply, and a cathode of D1 is connected to LED1, LED4, and one end of R1 and R2. LED1, ED2, and LED3 are connected in serial and then are connected to a collector of Q1, and LED4, LED5, and LED6 are connected in serial and then are connected to a collector of Q2. Emitters of the Q1 and Q2 are grounded. DZ1 is connected to LED1, LED2, and LED3 in parallel, and DZ2 is connected to LED4, LED5, and LED6 in parallel. The other end of R1 is respectively connected to a base of Q1 and one end of C2, and the other end of C2 is connected to the collector of Q2. The other end of R2 is respectively connected to a base of Q2 and one end of C1, and the other end of C1 is connected to the collector of Q1. The driving circuit is capable of completely controlling a temperature of LED chips, avoiding use of a large area of aluminum to dissipate heat, and reducing material cost.

6 Claims, 1 Drawing Sheet

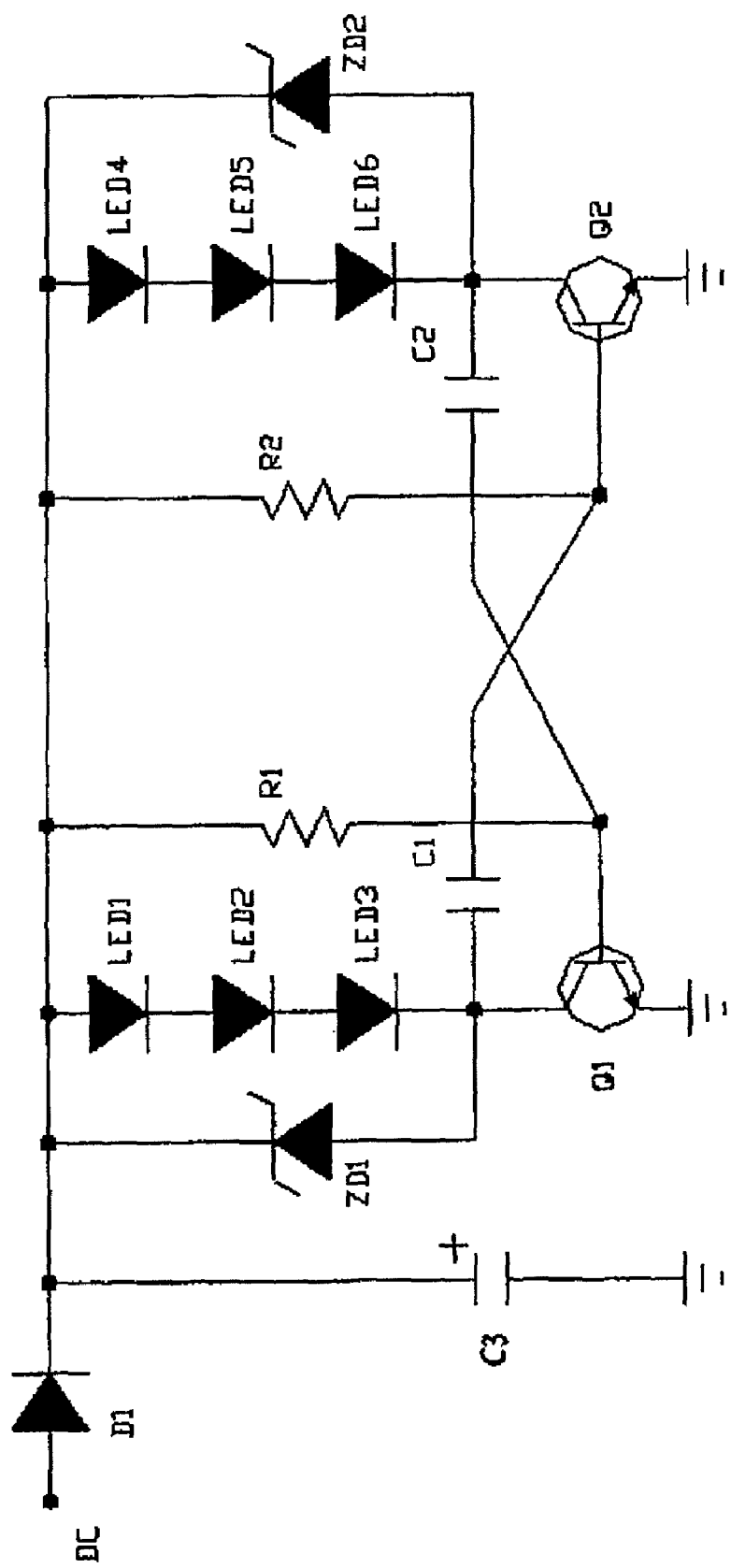

HIGH-POWER LED DRIVING CIRCUIT

BACKGROUND OF THE INVENTION

1. Field of Invention

The present invention relates to the photoelectric technology field, and more particularly to a high-power light-emitting diode (LED) driving circuit.

2. Related Art

Two driving modes are provided to light the current high-power LED chips. One is a DC power supply constant current driving method, in which the DC power is directly introduced into the LED for use. This method is a basic mode for lighting the LED, and the working principle is that the LED lamp is lit as long as VF basic voltage and IF current requirements of the LED are met. In order to achieve the optimal luminance, the maximum value of the VF is normally used to drive the LED, with a main disadvantage of causing the LED chip to generate a high temperature above 250° C. and accelerating the aging or burning at the high temperature. The LED lamps are usually used in enclosed space without the function of dissipating heat by air convection, which requires a large area of aluminum with a high cost as a heat-dissipating plate to guide and dissipate the heat, resulting in an extra cost. If the heat is not suitably guided and dissipated, the LED may have the problem of high temperature aging, and the luminance will be quickly reduced, or the LED may even be burnt due to the high temperature, thereby increasing the high material cost. The other mode is a DC power supply pulse width modulation (PWM) constant current driving method, which needs to use an integrated circuit with a high price to generate a modulated pulse and control the current, so the cost of the circuit is too high. In addition, in order to satisfy the light-emitting luminance of the LED chips, it is necessary to provide a current of 150-350 mA to LED chips. Such a high current forces the LED chips to generate a high temperature of 250° C. at the same time in the process for converting electric energy into light energy. Therefore, it is necessary to add a large area of aluminum to guide the heat dissipation; otherwise, the LED will immediately be aged due to the high temperature and the luminance is reduced, or will be burnt at the high temperature.

SUMMARY OF THE INVENTION

Accordingly, the present invention is directed to a high-power LED driving circuit, which is capable of completely controlling a temperature of LED chips, effectively reducing aging of the high-power LED chips, avoiding use of a large area of aluminum to dissipate heat, and reducing material cost.

The high-power LED driving circuit is characterized in that an anode of a diode D1 is connected to a constant current DC power supply; a cathode of the diode D1 is connected to anodes of LED1, LED4, and one end of resistors R1 and R2; LED1, LED2, and LED3 are connected in serial and then are connected to a collector of a transistor Q1; LED4, LED5, and LED6 are connected in serial and then are connected to a collector of a transistor Q2; emitters of the transistors Q1 and Q2 are grounded; a Zener diode DZ1 is connected to LED1, LED2, and LED3 in parallel; a Zener diode DZ2 is connected to LED4, LED5, and LED6 in parallel; the other end of the resistor R1 is respectively connected to a base of the transistor Q1 and one end of a capacitor C2; the other end of the capacitor C2 is connected to the collector of the transistor Q2; the other end of the resistor R2 is respectively connected to a base of the transistor Q2 and one end of a capacitor C1; and the other end of the capacitor C1 is connected to the collector of the transistor Q1.

The high-power LED driving circuit is characterized in that the cathode of the diode D1 is grounded by connecting an electrolytic capacitor C3, and capacitance of the electrolytic capacitor C3 is 10 UF.

The high-power LED driving circuit is characterized in that resistance of the resistors R1 and R2 is 33 KΩ, and capacitance of the capacitors C1 and C2 is 1 UF.

The high-power LED driving circuit is characterized in that the transistors Q1 and Q2 are NPN-type.

The high-power LED driving circuit is characterized in that a regulated voltage value of the Zener diodes DZ1 and DZ2 is 12 V.

The high-power LED driving circuit is characterized in that a power of the LED2 and LED5 is 1-3 W, and a power of the LED1, LED3, LED4, and LED6 is 0.3-0.5 W.

The high-power LED driving circuit uses transistors with low costs to make a STABLE symmetric pulse oscillating circuit and then outputs the voltage in the form of pulse. In a first half cycle, the circuit supplies a voltage higher VF to LED lamps. The LEDs are excited by a high voltage within a very short time and emit an effective luminance, improving the generated luminance in the LED chips. Then, the LEDs reach the normal VF voltage again and resume normal luminance. In a second half cycle, the circuit disables the voltage and causes the LEDs to fall into a dormant state. Therefore, the LED chips will be cooled within this time, that is, the LEDs rest. In such a manner, the temperature of the LEDs is effectively controlled without generating a too high temperature. Thus, a heat-dissipating plate having a large area for guiding and dissipating the heat is not needed, and the production cost of the LED lamps is reduced.

BRIEF DESCRIPTION OF THE DRAWINGS

FIG. 1 is a schematic circuit diagram of a high-power LED driving circuit according to the present invention.

DETAILED DESCRIPTION OF THE INVENTION

The present invention will be described in detail below with reference to the accompanying drawings.

The present invention uses intelligent asymmetric DC pulses to drive high-power LEDs, which is a new differential driving method. Transistors with low costs are used to design an ASTABLE DC oscillating circuit and generate an asymmetric excitation pulse wave. An oscillating frequency of the ASTABLE circuit is set between 100-110 HZ. When the high-voltage pulse wave passes through the interior of the LED chips, the LED chips will be immediately excited, electric energy is converted into light energy to generate a strong luminance, and then the LED chips immediately enter a lighting mode. After a half cycle, the LED lamps are turned off, and the LED chips fall into a dormant and cooling state. The same working state is repeated in the next cycle, such that a light-emitting effect with a high luminance is achieved and the LED chips have cooling time. The main theoretical basis of adopting the pulse wave differential drive lies in that: human eyes can obviously sense flickering below 17 HZ; however, when the frequency is raised to 32 HZ, the visual nerve may consider that the light is continuous and uninterrupted. This is the principle of using 32 frames in the animation and films, i.e., utilizing the human visual persistence effect. Currently, energy saving lamps used in the household is powered by an alternating current (AC) of 60 HZ, and the energy saving lamps flicker 60 times every second. However, the sensed light is not flickering due to the visual nerve persistence effect. Therefore, in the present invention, the application frequency is designed to be 100-110 HZ, which increases the frequency of the high-power LED, so as to enable the LED lamps to emit light more stably.

As shown in the figure, an anode of a diode D1 is connected to a constant current DC power supply, and a cathode of the diode D1 is connected to anodes of LED 1, LED4 and one end of resistors R1 and R2. LED1, ED2, and LED3 are connected in serial and then are connected to a collector of a transistor Q1, and LED4, LEDS, and LED6 are connected in serial and then are connected to a collector of a transistor Q2. Emitters of the NPN-type transistors Q1 and Q2 are grounded. A Zener diode DZ1 is connected to LED1, LED2, and LED3 in parallel, and a Zener diode DZ2 is connected to LED4, LEDS, and LED6 in parallel. The other end of the resistor R1 is respectively connected to a base of the transistor Q1 and one end of a capacitor C2, and the other end of the capacitor C2 is connected to the collector of the transistor Q2. The other end of the resistor R2 is respectively connected to a base of the transistor Q2 and one end of a capacitor C1, and the other end of the capacitor C1 is connected to the collector of the transistor Q1. The cathode of the diode D1 is grounded by connecting to an electrolytic capacitor C3, and the capacitance of the electrolytic capacitor C3 is 10 UF. The resistance of the resistors R1 and R2 is 33 KΩ and the capacitance of the capacitors C1 and C2 is 1 UF. A regulated voltage value of the Zener diodes DZ1 and DZ2 is 12V. LED2 and LED5 are main high-power LEDs, and the power of the LED2 and LED5 is 1-3 W. LED1, LED3, LED4, and LED6 have effects of voltage distribution and protection, and the power of the LED1, LED3, LED4, and LED6 is 0.3-0.5 W. The diode D1 is connected to the constant current DC power supply in series, mainly for protecting the circuit from the impact of reverse currents, and the electrolytic capacitor C3 is used as a power filter. The LED1, LED2, and LED3 are connected to the transistor Q1, mainly for driving and lighting the LED1, LED2, and LED3. The transistor Q2 is mainly for driving and lighting the LED4, LEDS, and LED6. The Zener diode DZ1 is connected to the LED1, LED2, and LED3 in parallel, for clamping a working voltage of the LED1, LED2, and LED3 and producing protective effects. The Zener diode DZ2 is connected to the LED4, LED5, and LED6 in parallel, for clamping a working voltage of the LED4, LED5, and LED6 and producing protective effects. All the electronic components can be made into the form of surface mounting components to reduce the area of the circuit board.

The working principles are described as follows. When the transistor Q1 is in an ON state, the LED1, LED2, and LED3 are in a current conduction state, the collector of the transistor Q1 has a low potential, and the LED1, LED2, and LED3 are lit. The base of the transistor Q2 is connected to a low potential through the capacitor C1, and thus, the transistor Q2 is in an OFF state; the LED4, LED5, and LED6 are turned off, and the capacitor C1 starts to be charged to form the first half cycle. When the potential value of the capacitor C1 reaches a VB value of the transistor Q2, the transistor Q2 starts to be conducted to enter an ON state, and the collector of the transistor Q2 has a low potential. The current of the LED4, LED5, and LED6 is conducted and LED4, LED5, and LED6 start to be lit. The base of the transistor Q1 is connected to a low potential through a capacitor C2, and the transistor Q1 is converted into an OFF state. The LED1, LED2, and LED3 are turned off, and the states of the transistors Q1 and Q2 are exchanged. The capacitor C2 starts to be charged to form the second half cycle. When the voltage of the capacitor C2 reaches a VB value of the transistor Q1, the transistor Q1 is changed back into the ON state and completes one cycle. Such a cycle is continuously repeated. The cycle is determined by the value of R1×C2+R2×C1, the time T of to the cycle is equal to RC seconds (T=RC), and the frequency is 1/RC Hz.

What is claimed is:

1. A high-power light-emitting diode (LED) driving circuit, wherein an anode of a diode (D1) is connected to a constant current direct current (DC) power supply; a cathode of the diode (D1) is connected to anodes of (LED1), (LED4) and one end of resistors (R1) and (R2); (LED1),(LED2), and (LED3) are connected in serial and then are connected to a collector of a transistor (Q1); (LED4), (LED5), and (LED6) are connected in serial and then are connected to a collector of a transistor (Q2); emitters of the transistors (Q1) and (Q2) are grounded; a Zener diode (DZ1) is connected to the (LED1), (LED2), and (LED3) in parallel; a Zener diode (DZ2) is connected to the (LED4), (LED5), and (LED6) in parallel; the other end of the resistor (R1) is respectively connected to a base of the transistor (Q1) and one end of a capacitor (C2); the other end of the capacitor (C2) is connected to the collector of the transistor (Q2); the other end of the resistor (R2) is respectively connected to a base of the transistor (Q2) and one end of a capacitor (C1); and the other end of the capacitor (C1) is connected to the collector of the transistor (Q1).

2. The high-power LED driving circuit according to claim 1, wherein the cathode of the diode (D1) is grounded by connecting an electrolytic capacitor (C3), and capacitance of the electrolytic capacitor (C3) is 10 UF.

3. The high-power LED driving circuit according to claim 1, wherein resistance of the resistors (R1) and (R2) is 33 KΩ, and capacitance of the capacitors (C1) and (C2) is 1UF.

4. The high-power LED driving circuit according to claim 1, wherein the transistors (Q1) and (Q2) are NPN-type.

5. The high-power LED driving circuit according to claim 1, wherein a regulated voltage value of the Zener diodes (DZ1) and (DZ2) is 12 V.

6. The high-power LED driving circuit according to claim 1, wherein a power of the (LED2) and (LED5) is 1 W or 3 W, and a power of the (LED1), (LED3), (LED4), and (LED6) is 0.3-0.5 W.

* * * * *